United States Patent [19]

Erholm

[11] 4,364,434

[45] Dec. 21, 1982

[54] GROUND-RAKING, ROCK-GATHERING ATTACHMENTS FOR TRACTORS

[76] Inventor: Gary W. Erholm, 2309 "A" S. Tacoma Way, Tacoma, Wash. 98409

[21] Appl. No.: 297,717

[22] Filed: Aug. 31, 1981

[51] Int. Cl.³ ............................................. A01B 43/00
[52] U.S. Cl. ........................................... 171/63; 37/8
[58] Field of Search .................... 171/63, 94, 19; 37/8

[56] References Cited

U.S. PATENT DOCUMENTS 3,637,024 1/1972 Baskett .................................. 171/63
4,113,023 9/1978 Baskett .

*Primary Examiner*—Jay N. Eskovitz
*Attorney, Agent, or Firm*—Delbert J. Barnard; Eugene O. Heberer; Joan H. Pauly

[57] ABSTRACT

A bucket mounted ground-raking and rock-gathering attachment is picked up off the ground following rock-gathering, by operation of hydraulic cylinders on the tractor provided for lifting and lowering the bucket. The tractor is then driven to a dumping site whereat a passive tension strap, interconnected between a top portion of the attachment and an upper portion of the bucket support frame, holds the attachment in a substantially level position. Then, hydraulic cylinders on the tractor are operated to rotate the bucket, for dumping the debris, while the attachment is substantially maintained in position. A passive tension strap, interconnected between the top of the bucket and the top of the attachment to limit the extent of downward pivotal movement of the attachment relative to the bucket, bends to permit such dumping rotation of the bucket.

11 Claims, 8 Drawing Figures

GROUND-RAKING, ROCK-GATHERING ATTACHMENTS FOR TRACTORS

This invention relates to improved tractor-mounted ground-raking and rock-gathering apparatuses, and to improved methods of dumping debris from a bucket on which such apparatus is mounted.

This invention is in the nature of an improvement on the apparatus disclosed by U.S. Pat. No. 3,637,024 granted Jan. 25, 1972, to Theodore N. Baskett.

A disadvantage of the apparatus disclosed by U.S. Pat. No. 3,637,024 is that it utilizes a lifting mechanism between the ground-raking and rock-gathering attachment and the tractor carried bucket on which such attachment is mounted, for swinging the attachment into a position away from the mouth of the bucket, so that collected debris can be dumped out from the bucket. During use it was found that this method of dumping the debris was unsatisfactory.

According to the present invention, the raising and lowering apparatus disclosed by U.S. Pat. No. 3,637,024, which also functions to maintain the attachment a a proper height resiliently by the action of a spring-loaded cushioning cylinder, is replaced by a passive tension member which merely functions to maintain the attachment resiliently in working contact with the ground. An improved resiliency is achieved, particularly when such tension member is connected at one end to an adjustable force spring. A second passive tension member is interconnected between the attachment and a frame portion of the tractor. It functions to hold the attachment substantially horizontal during dumping of debris from the bucket.

An object of the present invention is to provide an improved method of dumping the debris from the bucket, utilizing only the hydraulic actuators on the tractor which are provided for raising, lowering and tilting the bucket relative to the tractor.

According to a method aspect of the invention, the lifting cylinders on the tractor are used for raising the bucket and the ground-raking and rock-gathering attachment carried thereby up to an elevated position. The tractor is then driven to a dumping site at which the forward end of the attachment is supported or held into a substantially horizontal attitude by means of the second passive member. With the attachment supported by the tension member, the lifting and tilting cylinders on the tractor are operated to rotate the bucket away from the attachment, whil maintaining the attachment in an essentially unchanged attitude. The bucket is rotated to direct its mouth downwardly, so that the debris will merely drop out of it and onto the ground below the elevated bucket and to the rear of the elevated and supported attachment. After the bucket has been emptied the cylinders are operated to rotate the bucket back into what may be termed a "level" attitude, and the vehicle is driven back to a new section of ground to be raked.

Reference is now made to the drawing, wherein.

Figure 1:
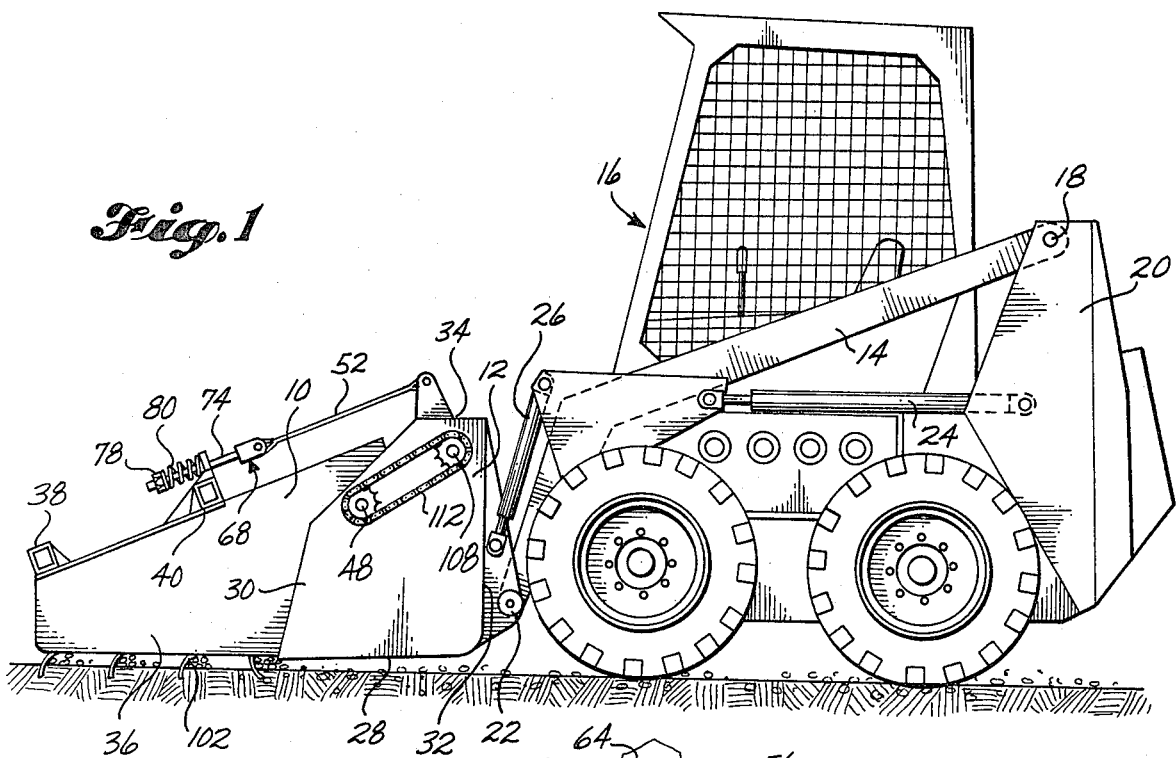
FIG. 1 is a side elevational view of a prior art tractor-mounted ground-raking and rock-gathering apparatus.
Figure 5:
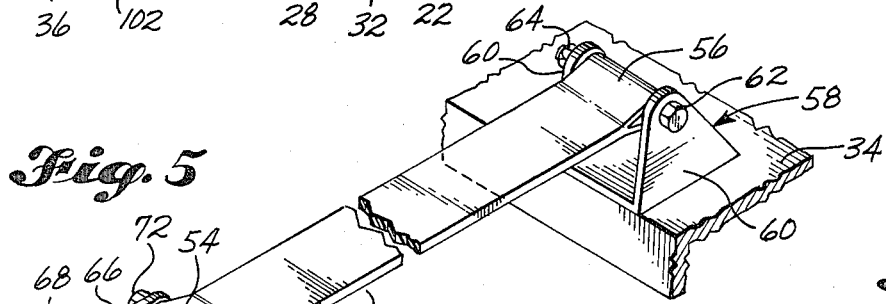
FIG. 5 is a fragmentary isometric view of the passive tension member which is interconnected between upper portions of the attachment and the bucket.

Referring first to FIG. 1, a ground-raking and rock-gathering attachment 10 is mounted onto a material-handling bucket 12. Bucket 12 is pivotally attached to a pair of support arms 14 located at opposite sides of the tractor 16. The rear ends of arms 14 are pivotally mounted at 18 to an upper rear frame portion 20 of the tractor 16. A lower rear portion of the bucket 12 is pivotally mounted at 22 to the forward ends of arms 14. A first pair of cylinders 24, interconnected between the tractor frame 20 and intermediate portions of the side arms 14, serve for raising and lowering the support arms 14 and the bucket 12 carried thereby. A second pair of hydraulic cylinders 26, interconnected between the support arms 14 and the bucket 12, serve to or tilt the bucket 12 about axis 22. Bucket 12 includes a bottom 28, a pair of side plates 30, a back plate 32 and a partial top plate 34.

The herein described attachment provides means for conditioning the ground in front of the bucket and for transferring rock and other debris to the interior of the bucket for transportation to a disposal site.

Figure 3:
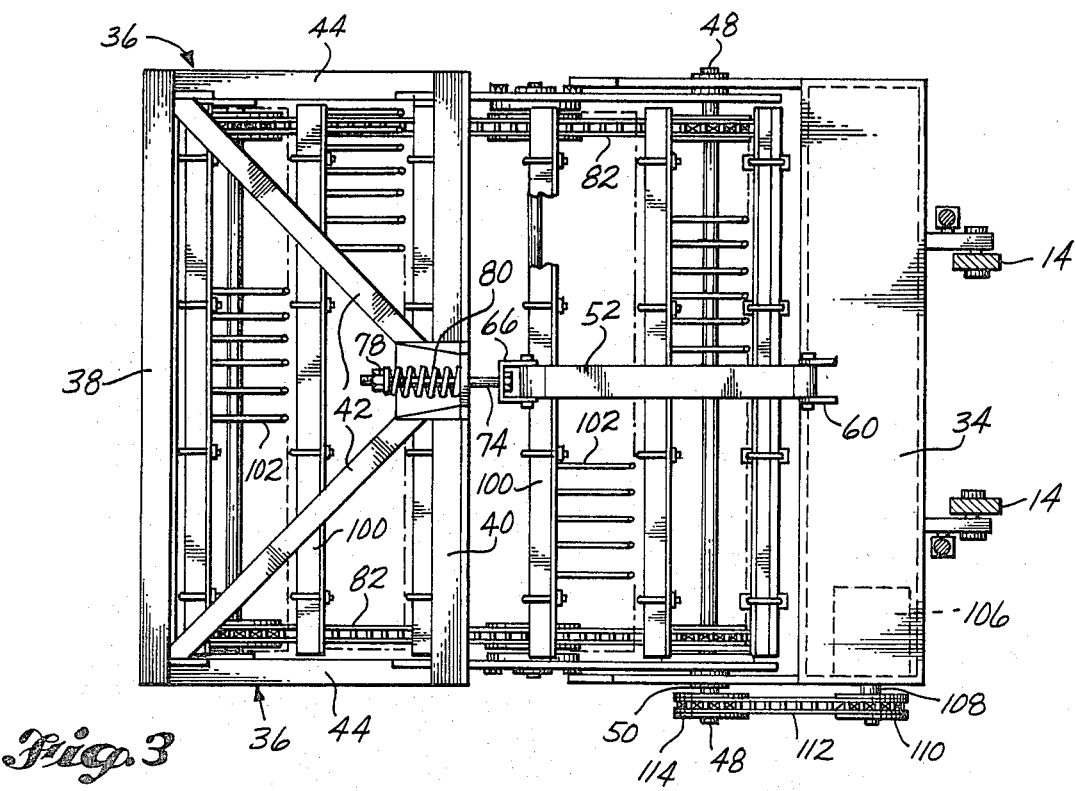
FIG. 3 is a top plan view of the attachment and the bucket.

The attachment 10 includes a frame, comprising a pair of vertical, parallel, horizontally spaced sideplates 36, a pair of transverse crosspieces 38, 40 a pair of diagonal braces 42, and a pair of longitudinal connecting bars 44 (FIG. 3).

Figure 2:
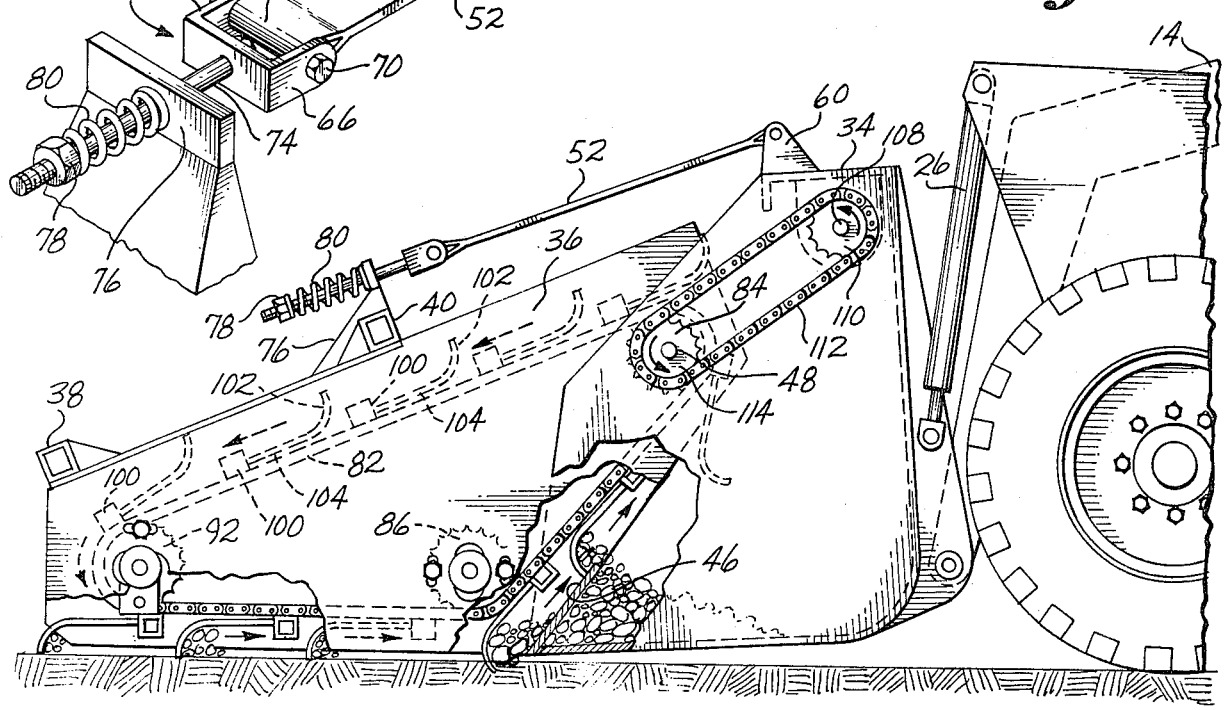
FIG. 2 is an enlarged scale side elevational view of the attachment and the tractor bucket, with parts thereof being partially broken away to show the construction and arrangement of interior parts.

A rearwardly inclined, combination guide plate and retaining plate 46 (FIG. 2) is mounted between sideplates 36 at their inner lower extremities.

One end of the frame thus constituted is pivotally connected across and within the sidewalls 30 of bucket 12 by means of a combination mounting and drive shaft 48. As shown in FIG. 3, this shaft 48 penetrates both sidewalls 26 of the bucket 12 and support plates 36. It is journaled in bearings 50 mounted on the latter.

Tension member 52 is preferably in the form of a belt provided with bolt receiving eyes 54, 56 at its opposite ends. Belt 52 may be constructed from the same type of material that is used for making heavy duty conveyor belts. That is, it is constructed from either real or synthetic rubber, reinforced with some sort of cord material.

The bucket end of member 52 is attached to a bracket 48 which is secured to bucket upper wall 34. Bracket 58 comprises a pair of spaced-apart apertued ears 60. A bolt 62 extends through the apertures and through eyes 56 in member 52 and is secured in place by a nut 64. The opposite end of tension member 52 is received within a pair of spaced apart side members 66 of a yoke 68. Another bolt 70 extends through apertures in the ears 66 and through the eyes 54, and is held in place by a nut 72. An elongated rod 74 extends from the base of the yoke through an oversized aperture provided in a bracket 76 which is secured to and projects upwardly from an upper portion of cross-piece 38. The end of rod 72 opposite yoke 68 is threaded and receives an adjustment nut 78. A compression spring 80 is clamped between bracket 76 and adjustment nut 78. As will be appreciated, tightening and loosening of the nut 78 will adjust the stored energy and compression spring 80, to in that manner adjust the resiliency of the strap 52.

In its lowered position, the frame 10 is maintained at the proper height resiliently by the action of spring-loaded passive tension member 52. This prevents damage to the assembly in the event of collision with rocks, roots, projecting pipes, concrete abutments, and the like.

Rotatably mounted on the frame is endless flexible support for the raking teeth.

The support for the teeth basically comprises a pair of parallel, endless chains 82. These engage sprockets 84 fixed to shaft 48 in sideplates 50. They also mesh with guide sprockets 86 fixed to a shaft 88 journaled in vertically adjustable bearings 90 mounted on plates 36; and with sprockets 92 fixed to shaft 94 journaled in horizontally adjustable bearings 96, mounted also in plates 36, FIG. 2.

It is to be observed that mounting the chains 82 in this manner provides upper and lower runs. The lower run is divided into two segments: a horizontal, forwardly extending segment which is substantially parallel to and in close proximity to the ground; and an upwardly inclined, rearwardly located segment which runs inside the bucket. This results in a characteristic three-point suspension of the assembly and makes possible raking the ground, gathering the rocks and other debris and transferring the latter into the bucket 12.

Chains 82 mount a plurality of crossbars 100 which in turn mount the raking teeth 102. The crossbars 100 are welded to links of the chains 98 in the manner shown in FIGS. 2 and 3.

Each crossbar 100 preferably comprises a hollow, box-shaped member having transversely therethrough a plurality of pairs of aligned, horizontally arranged openings. These are dimensioned to receive teeth 102. The outer ends of teeth 102 are accuarately shaped. Their inner ends are provided with angularly bent shanks 104. The teeth 102 thus may be inserted the openings by inserting the accurate ends, and pushing them entirely through until the bent shank ends 104 lie flush against the rearward surfaces of the crossbars 100.

Clamp means (not shown) are provided for releasably clamping the teeth in position, while still permitting their removal as required for repair of replacement.

Drive means are provided for driving the endless flexible support and the teeth which it supports in a direction such that the lower run delivers to the bucket solid objects gathered by the teeth.

The drive includes a motor, preferably an hydraulic motor 106, the drive shaft 108 of which mounts a sprocket 110. A chain 112 interconnects drive sprocket 110 with a companion sprocket 114 fixed to the end of shaft 48.

OPERATION

The operation of the herein described ground-raking and rock-gathering apparatus is as follows:

With the apparatus in the full line position of FIG. 1, tractor 16 is run backwardly while the drive for the endless flexible tooth support is operated to drive the lower run thereof in the direction of the tractor bucket 12. The assembly is maintained resiliently in working contact with the ground by operation of passive tension member 52 and associated spring assembly 76, 78, 80.

Teeth 102 condition the ground and also transport rocks, cans, bottles, wood fragments and other debris into contact with retaining guide 46. The elevated segment of the lower run of the support then lifts the debris upwardly into bucket 12 where it is retained by support 46.

Figure 4:
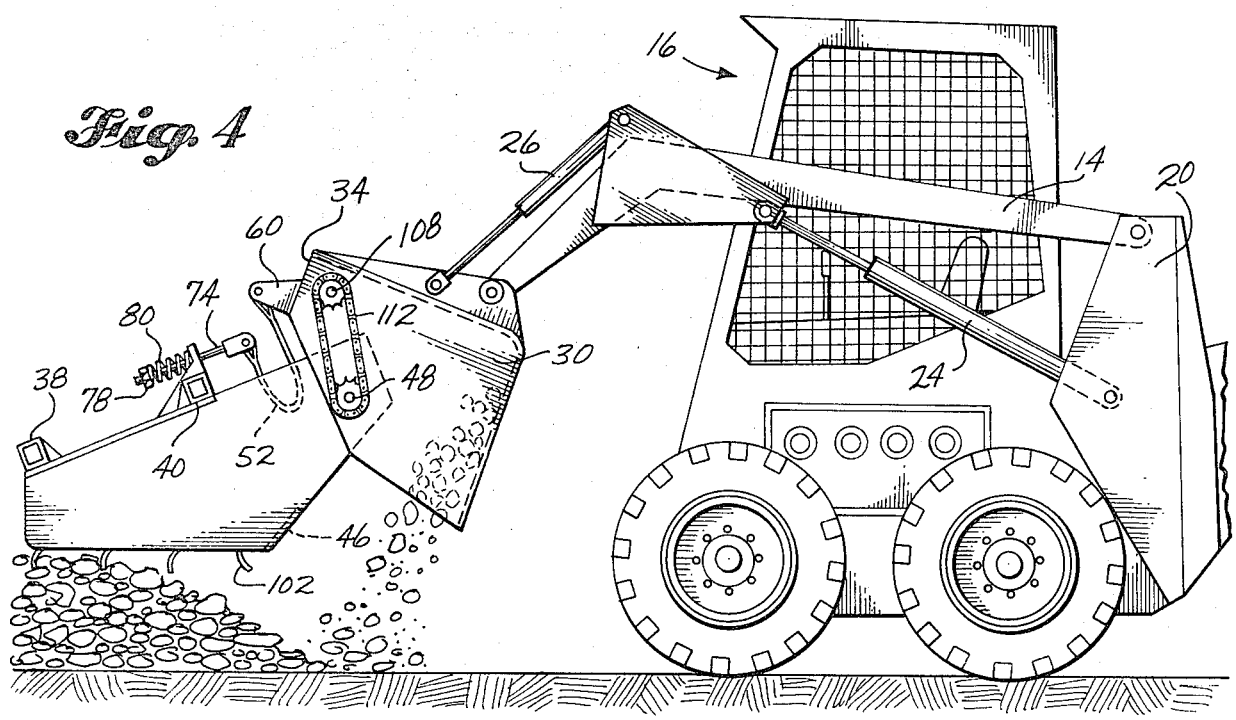
FIG. 4 is a side elevational view similar to FIG. 1, but showing the forward end of the attachment resting on a pile of rocks, and showing the bucket being elevated and rotated forwardly and downwardly, for dumping rocks out from the bucket.

When the bucket 12 is full, the tractor is moved in the normal manner to transport the debris to the disposal site. At the disposal site, the forward end of the attachment is set down on some elevated surface, such as the top of a debris pile. Then, the hydraulics 24, 26 are operated to rotate the bucket 12 forwardly about the axis of shaft 48, and to maintain the position of shaft 48 and the attitude of the attachment 10. As shown by FIG. 4, this results in a tipping of the bucket 12 away from the attachment 10 so that the debris will merely drop down onto the ground below the bucket 12. When this is done the passive tension member 52 merely bends in the middle and becomes limp.

Figure 6:
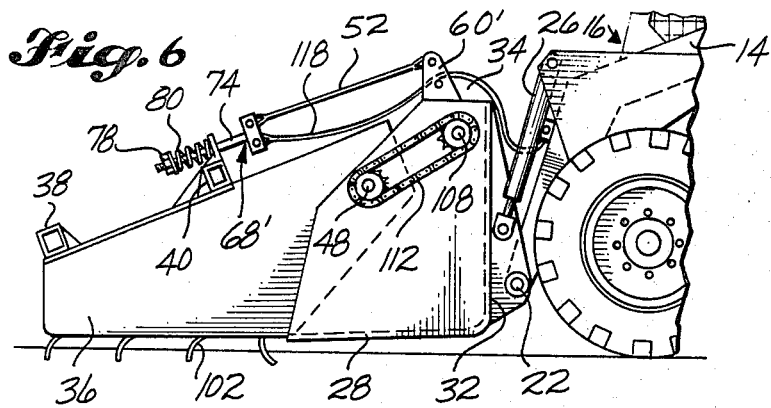
FIG. 6 is a view like FIG. 1, but with a substantial portion of the tractor omitted, such view showing a second passive tension member which is interconnected between in the rock picking attachment and the bucket carrying arms of the tractor, such view showing the second passive tension member in a slack condition during use of the mechanism for ground-raking and rock-gathering.
Figure 7:
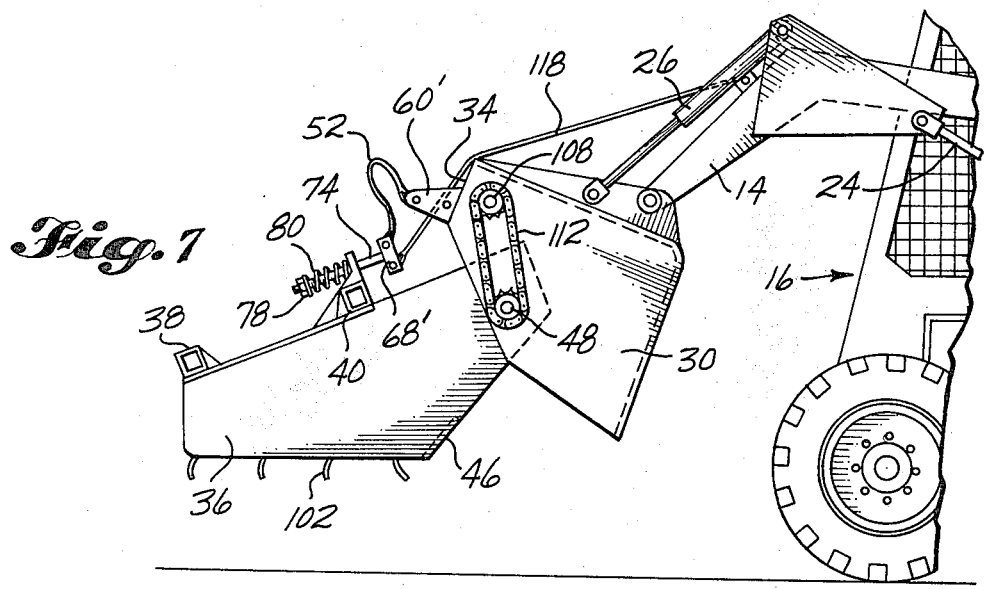
FIG. 7 is a view similar to FIG. 4, but showing the second passive tension means in a tensioned condition, supporting the attachment in a substantially horizontal attitude during the debris dumping operation.
Figure 8:
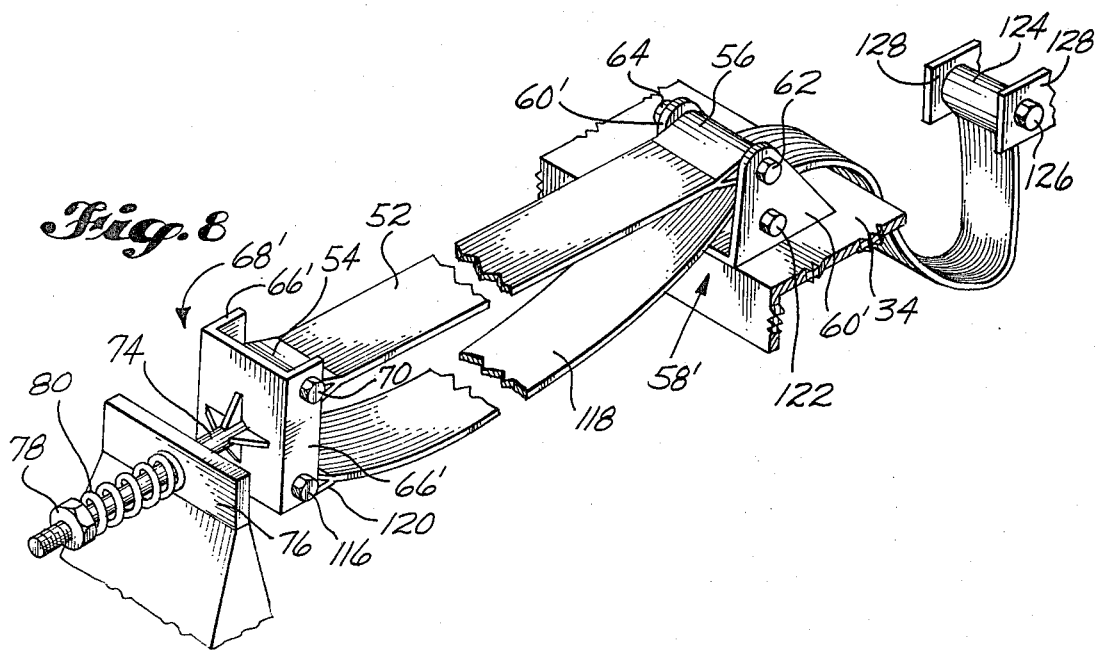
FIG. 8 is a view similar to FIG. 5, but of the embodiment of the invention shown by FIGS. 6 and 7.

The embodiment of FIGS. 6-8 is presently the preferred embodiment of the invention.

Referring to FIGS. 6-8, in this embodiment the yolk 68 prime is longer, and in addition to the bolt 70, for securing the end of strap 52, yolk 68' carries a second bolt 116 which secured the forward end of a second passive tension member 118 to the yolk 68'. The tension member 118 is preferably also in the form of a strap having an eye 120 formed at its forward end through which the bolt 116 passes. Bolt 116 also passes through aligned openings in the side members 66' of the yolk 68'. Preferably, the forward end portion of tension member 118 is secured to the yolk 78' at a position spaced vertically below the securement of the forward end of the first tension member 52.

Bracket 58' also supports a pair of bolts. As in the first embodiment, the first bolt 62 passes through an eye at the rear end of the tension member 52 and secures such end of tension member 52 to 58'. A second bolt extends through the side members 60' of the bracket 58'. Bolt 122 is spaced vertically below space 62 and is also secured by means of nut (not shown). In this embodiment, the shank portion of the bolt serves as a guide or bearing for tension member 118.

The rear end of tension member 118 is also formed to include an eye 124. A securement bolt 126 extends through such eye 124 and through a pair of spaced apart side arms 128 which at their bases are secured to upper portions of the bucket support arms 14.

As shown by FIG. 6, the tension member 118 is of such a length that when the upper tension member 52 is in tension, and the attachment is being used for ground raking and rock picking, the lower tension member 118 is slack. However, upward swinging movement of the support arms 14 puts tension into the tension member 118, so that as it is lifted off of the ground it maintains a substantially horizontal attitude similar to what is provided by the pile of debris in FIG. 4. When the cylinders 26 are actuated to cause a rearward swinging of the bucket 30, and a resulting dumping of debris (not shown) from the bucket, the tension member 118 maintains the attachment 126 in such attitude. Thus, the presence of the second tension member 118 permits the same dumping action that has been described above in connection with FIGS. 1–5 but without it being necessary to support the forward end of the attachment 36. The support is provided by a tension member 118 and it is continuous.

Having thus described by invention and preferred embodiment, I claim as new and desire to protect by Letters Patent:

1. A ground-raking and rock-gathering attachment for a tractor bucket of a type which is rotatable forwardly from the tractor about a first axis, for unloading material from said bucket, said attachment comprising:
   a frame;
   means for mounting said frame onto the bucket for pivotal movement relative to said bucket about a second axis which extends parallel to the first axis;
   power driven rake means on said frame, adapted to rake rocks into the bucket when the frame means is lowered and the tractor is backing up;
   a first passive tension member interconnected between an upper portion of said frame and an upper portion of the tractor bucket, to provide a resilient interconnection between the frame and the bucket, serving to limit the extent of pivotal movement of the frame in a downward direction about said second axis, but being collapsable to allow pivotal movement of the frame about the second axis in the upward direction and;
   a second passive tension member which is interconnected between the upper portion of said frame and an upper frame portion of the tractor, said second passive tension member being slack when the attachment is being used for ground-raking and rock-gathering but being in tension when the bucket and attachment are raised off the ground, and that time serving to the attachment while the bucket is being rotated relative to the attachment, for dumping debris.

2. An attachment according to claim 1, wherein said first passive tension member is of fixed length and at one end is connected to a fixed support and at its opposite end is connected to a resilient support.

3. An attachment according to claim 2, wherein the resilient support comprises a fixed abutment having an opening therein, a connector member secured to the second end of the tension member and including an elongated rod which projects through said opening and which is threaded at its end opposite the tension member, an adjustment nut on the threaded portion of said rod, and a compression spring between said nut and the abutment.

4. An attachment according to claim 1, wherein the tension member is constructed from a length of flat belt-like material and it has an eye at each of its ends by which it is attached, at one end to the bucket and at its opposite end to the attachment.

5. An attachment according to claim 1, wherein said second passive tension member is of fixed length and on one end is connected to a fixed support and at its opposite end is connected to a resilient support.

6. An attachment according to claim 5, wherein the first passive member is also of fixed length and at one end is connected to a fixed support and its opposite end is connected to a resilient support.

7. An attachment according to claim 6, wherein the said opposite end of the first and second passive tension members are connected to a common resilient support.

8. An attachment according to claim 7, wherein the resilient support comprising a fixed abutment having an opening therein, a connector member to which end portions of both the first and second passive tension members are connected, an elongated rod which projects through said opening, said rod being threaded at its end opposite the tension members, an adjustment nut on the end portion of the rod and a compression spring between said nut and the abutment.

9. An attachment according to claim 1, wherein the second passive tension member is constructed from a length of flat belt-like material and has an eye at each of its ends by which it is attached, at one end to the tractor frame and at its opposite end to the attachment.

10. In combination, a tractor comprising a pair of bucket support arms, one on each side of the tractor, said support arms being pivotally attached at their rear ends to a frame portion of the tractor; a bucket mounted onto the forward ends of the support arms, for pivotal movement about a horizontal axis; hydraulic cylinder means interconnected between the rear frame portion of the tractor and an intermediate portion of the support arms, for raising and lowering the support arms and the bucket attached thereto; and hydraulic cylinder means interconnected between intermediate portions of the support arms and the bucket, for pivoting the bucket relative to the support arms; and
   a ground-raking and rock-gathering attachment for the tractor bucket comprising a frame; means mounting said frame onto the bucket, for pivotal movement about a horizontal axis; power driven rake means on said frame, adapted to rake rocks into the bucket when the attachment is down on the ground and the tractor is being backed up; and a passive tension member interconnected between an upper portion of said frame and an upper portion of the support arms, said tension member serving to hold the attachment in position relative to the support arms,
   whereby rocks which have been raked into the bucket may be removed from the bucket by the operator operating the hydraulic cylinder means to both elevate the bucket and tip it forwardly relative to the tractor.

11. A method of using the apparatus of claim 10, comprising lowering the bucket onto the ground, then backing the tractor up while powering the power driven rake means to rake rocks and other debris into the bucket; then picking the bucket and attachment up and holding the attachment in position relative to the support arms by use of said passive tension member; then operating the hydraulic cylinder means to rotate the bucket downwardly while maintaining the attachment substantially still, to dump debris from the bucket.

* * * * *